Figure 6:
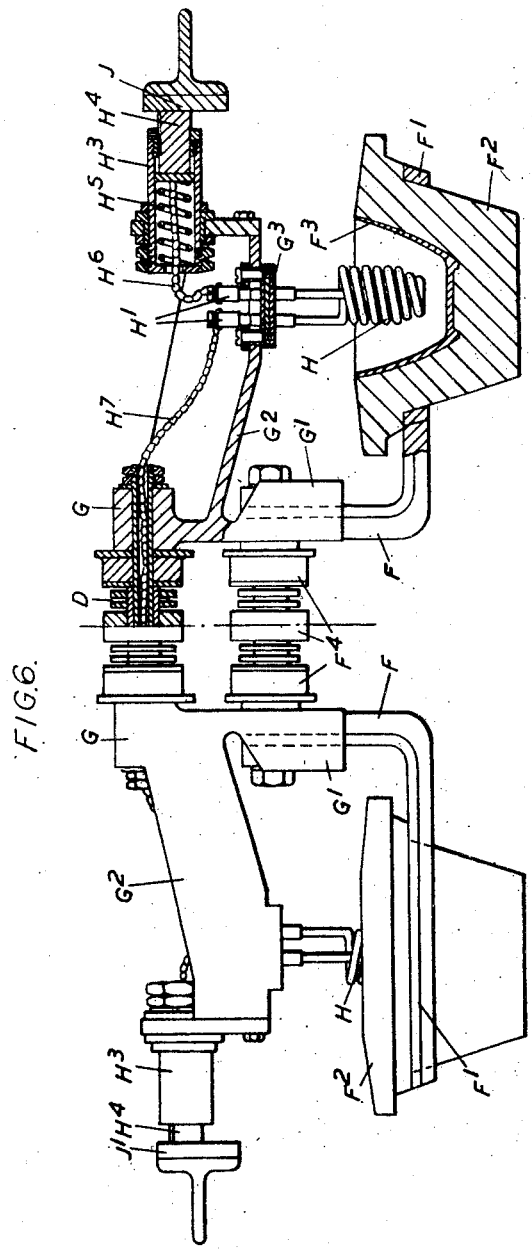

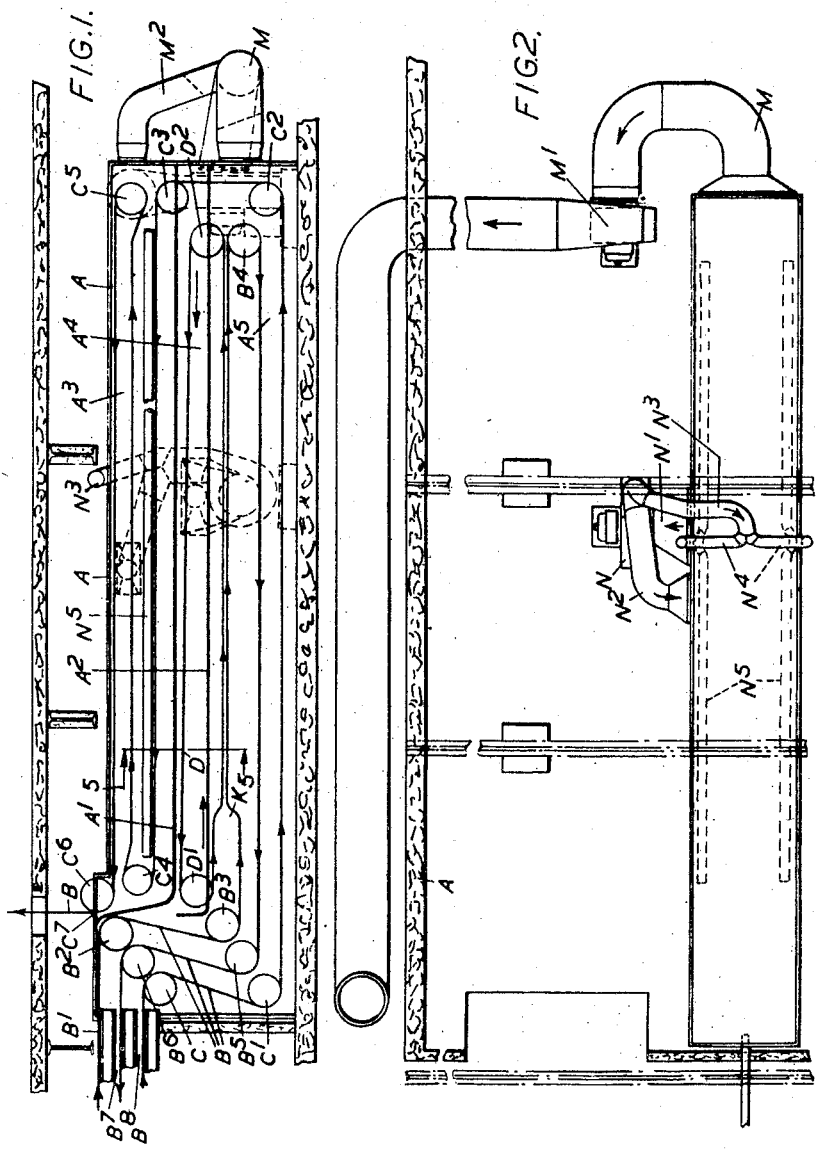

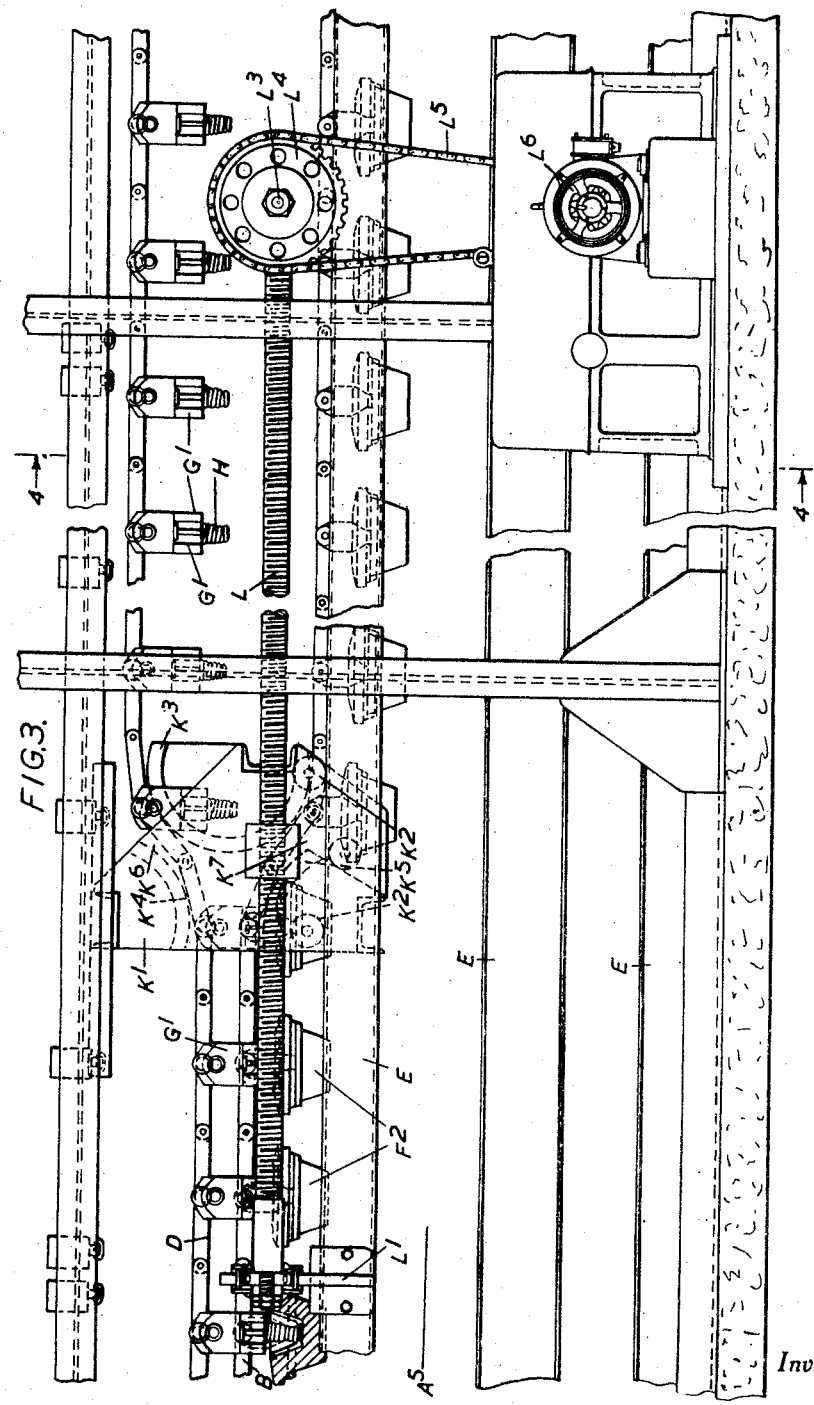

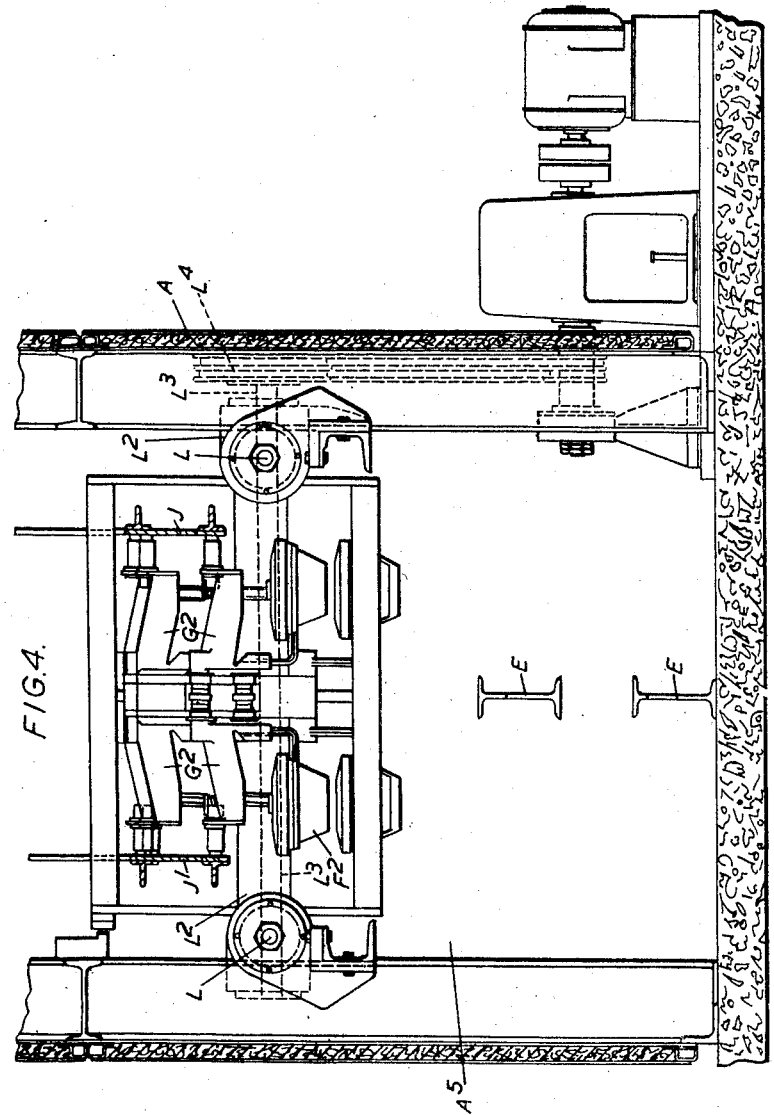

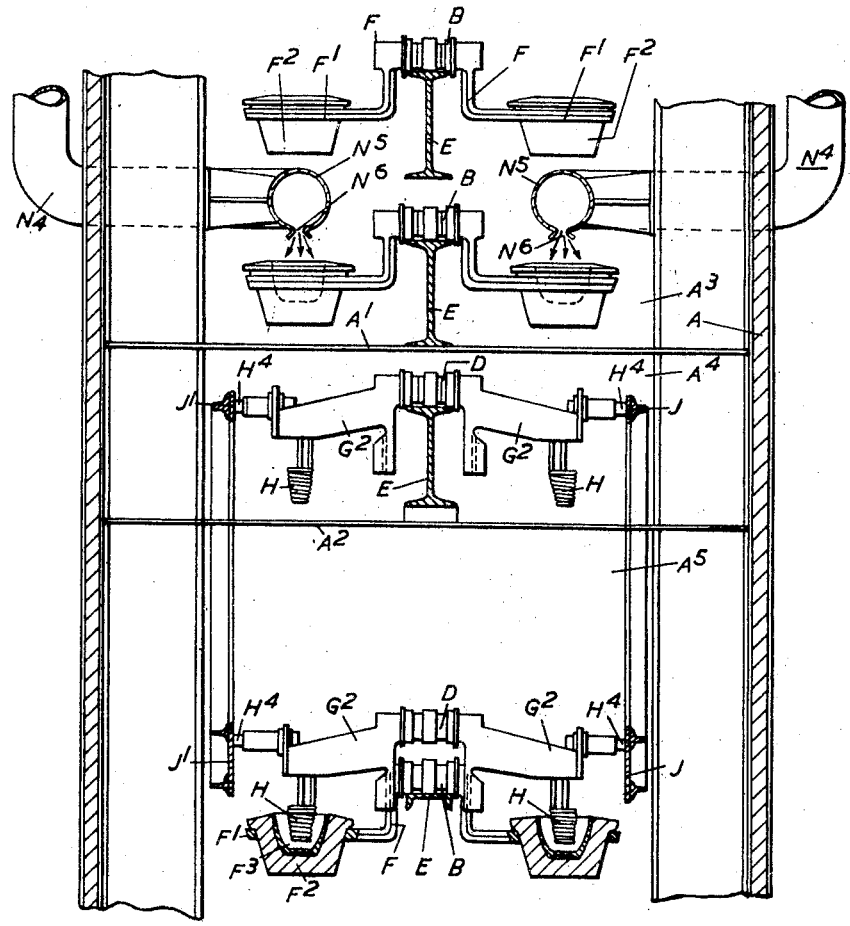

July 24, 1951     S. J. MOORE ET AL     2,561,629
APPARATUS FOR APPLYING HEAT TO A SERIES OF ARTICLES
Filed Nov. 22, 1948     5 Sheets-Sheet 5

Inventor
Sydney J. Moore and
Clement T. Wedgwood
By Emery Holcombe & Blair
Attorneys Patented July 24, 1951

2,561,629

UNITED STATES PATENT OFFICE 2,561,629

APPARATUS FOR APPLYING HEAT TO A SERIES OF ARTICLES

Sydney Jack Moore, London, and Clement Tom Wedgwood, Barlaston, Stoke-on-Trent, England, assignors to Sulzer Bros. (London) Limited, London, England, and Josiah Wedgwood & Sons Limited, Barlaston, Stoke-on-Trent, England, both companies of Great Britain Application November 22, 1948, Serial No. 61,346
In Great Britain November 18, 1947

13 Claims. (Cl. 34—105)

This invention relates to apparatus for applying a heat treatment to a series of articles and is particularly applicable to the drying or baking of pottery articles. The object of the invention is to provide apparatus whereby a continuous series of articles may be subjected to heat treatment in a manner suited to flow production and permitting of close adjustment and control of the heat treatment applied to each individual article.

To this end apparatus for applying heat treatment to articles, according to the present invention, comprises an endless article-conveying device carrying spaced supports for the articles to be treated, an endless heater-conveying device carrying a series of similarly spaced electric heating elements each capable of lying partly or wholly within or over an article, and means for supporting and driving the two conveying devices so that for a substantial part of their lengths they travel together at the same linear speed and in such relationship that a heating element lies partly or wholly within or over each article as the conveyors travel together between meeting and separating points.

As stated, the invention is particularly applicable to apparatus for drying and baking pottery articles and is specially suited to the drying of hollow pottery articles such as cups or bowls within each of which a heating element then lies as the conveyors travel between the meeting and separating points.

In any case the supports for the pottery or other articles on one conveyor and the electric heating elements on the other conveyor preferably have co-operating parts which come into engagement as the two conveyors approach one another at the meeting point and serve positively to locate each heating element in relation to its associated pottery or other article as the conveyors travel together.

In order to ensure that the two conveyors are driven at the same speed, they are conveniently driven through chain or other gearing from a common driving shaft, for example, the shaft of an electric motor, which may be electrically synchronised with electric motors driving other apparatus used in the manufacture of the articles to which the heat treatment is to be applied.

The invention may be carried into practice in various ways but one construction according to the invention is illustrated by way of example in the accompanying drawings, in which:

Figure 1 is a diagrammatic sectional side elevation of one form of apparatus according to the invention, Figure 2 is a diagrammatic plan of the construction shown in Figure 1, Figure 3 is a sectional side elevation, partly broken away and on an enlarged scale of part of the apparatus shown in Figures 1 and 2, viewed from the opposite side from Figure 1, certain parts being omitted for convenience, Figure 4 is a cross section in the plane 4—4 of Figure 3, Figure 5 is a section on the line 5—5 of Figure 1 but on the same scale as Figures 3 and 4, and Figure 6 is an end elevation partly in section and on a still further enlarged scale showing the construction of the heater and pottery supports and their associated parts.

In the construction illustrated the apparatus comprises a chamber A of generally rectangular form containing within it a number of longitudinally extending rail like supports for endless conveying devices and two generally horizontal partitions $A^1$, $A^2$ dividing it into an upper compartment $A^3$, an intermediate compartment $A^4$ and a lower compartment $A^5$.

An endless conveyor B for pottery articles to be treated enters the casing A at $B^1$, passes over a guide sprocket $B^2$, under a guide sprocket $B^3$, along the compartment $A^5$, around a sprocket $B^4$, back along the compartment $A^5$ under a sprocket $B^5$, over a sprocket $B^6$, and out of the casing at the point $B^7$. This same conveyor after passing through a station (not shown) in which the pottery articles are removed therefrom re-enters the casing A and $B^8$, passes over a sprocket C, under a sprocket $C^1$, along the compartment $A^5$, under a sprocket $C^2$, up through the partitions $A^2$ and $A^1$ into the compartment $A^3$, over a sprocket $C^3$, along the compartment $A^3$, around a sprocket $C^4$, back along the compartment $A^3$, around a sprocket $C^5$, again along the compartment $A^3$, under a sprocket $C^6$ and upwards out of the compartment $A^3$ at $C^7$.

Appropriate sprockets are driven, for example by electric motors, synchronised with one another and with motors driving other parts of the pottery making installation with which the apparatus is associated.

Arranged within the casing A is a second endless conveyor D extending around sprockets $D^1$ and $D^2$ at opposite ends of the casing so that the upper half thereof lies in the compartment $A^4$ while the lower part lies in the compartment $A^5$.

The conveyors are supported throughout the major parts of their lengths by supporting rails E within the casing A engaged by rollers on the conveyors in known manner.

The conveyor B comprises an endless chain of generally known form from which at even intervals extend arms F formed with sprockets $F^1$ at their ends to receive moulds $F^2$ for articles of pottery indicated at $F^3$. The chain includes rollers $F^4$ for engagement with the rails E.

The conveyor D comprises an endless chain carrying on each side of it at spaced points, the same distance apart as the arms F on the conveyor B, supporting members G including a downwardly projecting forked part $G^1$ providing a slot between the two parts thereof, and an outwardly extending part or arm $G^2$. Each arm $G^2$ is provided with a bore in which is mounted an electrically insulating disc $G^3$ from which is supported an electrical heating device H having terminals $H^1$. Also supported on each arm $G^2$ is an electrically insulating housing $H^3$ containing a brush $H^4$, for example of carbon, pressed outwardly by a helical spring $H^5$ and connected by a conductor $H^6$ to one of the terminals $H^1$. The two terminals $H^1$ on each pair of arms $G^2$, situated at the same point in the length of the conveyor D, which are not connected to the brushes $H^4$ are connected to one another by a conductor $H^7$.

The brushes $H^4$ on the two sides of the conveyor D are pressed by the springs $H^5$ into continuous engagement respectively with bus bars J, $J^1$ supported within the chamber A, these bus bars being connected to opposite sides of a suitable source of electrical supply.

At a point indicated at K in Figure 1 the adjacent parts of the conveyors B and D, which are moving in the same direction and at the same speed, are caused to approach one another, this point being referred to for convenience as the meeting point. This is effected by means of mechanism comprising a support $K^1$ mounted to be capable of longitudinal adjustment upon rollers $K^2$ engaging one of the rails E as shown in Figure 3 and provided with curved guides $K^3$, $K^4$, $K^5$ forming in effect two converging channels $K^6$, $K^7$ through which the conveyors D and B are respectively caused to pass so that they are brought towards one another and, from the point K to the point where they pass respectively round the sprockets $D^2$ and $B^4$, travel together in close proximity one above the other.

The arrangement is such that as the two conveyors D and B are brought together the forked parts $G^1$ engage with the arms F as shown in Figures 3, 4, 5 and 6 so that the arms F enter the slots in the forked parts $G^1$, whereby the parts $G^1$ and hence the arms $G^2$ and the heating devices H are located correctly with respect to the arms F and the moulds $F^2$ and articles $F^3$ as shown most clearly in Figure 6. If desired the parts $G^1$ may rest upon the upper ends of the arms F so that the heating devices are not only located centrally within the articles $F^3$ but are also located correctly vertically therein by the interengagement of the parts $G^1$ with the arms F. It will be appreciated that the parts $G^1$ make a comparatively close but easy fit with the arms F so as to give satisfactory location and yet allow for easy engagement and disengagement of the parts.

The support $K^1$ is adjustable longitudinally by means of two screwthreaded rods L each supported at one end in a bearing in a plate $L^1$ from one of the rails E and at its other end in a bearing in a gear casing $L^2$ extending across the casing A as shown in Figure 4. The casing $L^2$ contains a shaft $L^3$ carrying bevel wheels meshing with bevel wheels on the ends of the rods L, the shaft $L^3$ extending outside the casing $L^2$ and being provided with a sprocket $L^4$ connected by a chain $L^5$ to a reversible electric motor $L^6$. Thus, by causing the electric motor $L^6$ to rotate in one direction or the other, the rods L can similarly be caused to rotate in one direction or the other so as to move the support $K^1$ backwards or forwards and thus vary the distance between the point K and the sprockets $B^4$ and $D^2$ and hence the period during which each of the heating devices H is within an article $F^3$, that is to say the degree of drying of each article.

As is shown in Figures 1 and 2 air is withdrawn continuously from the right hand end of the compartment $A^5$ through a trunk M by a fan $M^1$ and discharged into the atmosphere. Thus air enters at the points $B^7$, $B^8$ and then flows downwards into the left hand end of the compartment $A^5$ and along this compartment so that comparatively dry air is continuously drawn into the left hand end of the compartment, picks up the moisture expelled from the articles $F^3$ by the heaters H as they pass along the compartment $A^5$ and is withdrawn from the righthand end of this compartment.

In addition an air pump N draws air from an intermediate point in the length of the compartment $A^4$ through a passage $N^1$ and delivers it partly through a passage $N^2$ into approximately the centre of the length of the compartment $A^3$ and partly through passages $N^3$, $N^4$ to two nozzle members $N^5$ supported in the compartment $A^3$, these nozzles being in the form of part cylindrical inverted trough like members, as shown most clearly in Figure 5 so as to provide slot like nozzles $N^6$ lying over the moulds carried by the part of the conveyor B extending between the sprocket $C^3$ and $C^4$. Thus, as the empty moulds pass between the sprockets $C^3$ and $C^4$ air which has been heated by the heating elements H as they pass through the compartment $A^4$ is delivered into them by the nozzle members $N^5$, $N^6$ while additional hot air is delivered through the passage $N^2$ into the compartment $A^3$. Air is constantly withdrawn from the compartment $A^3$ by a branch passage $M^2$ communicating with the passage M so as to carry away continuously the heated moist air from the compartment $A^3$.

The air withdrawn from the compartment $A^4$ through the passage M continuously enters this compartment at the lefthand end from the points $B^7$, $B^8$. It will be seen from Figure 1 that in order to provide for this flow of air the partition $A^2$ does not completely seal off the left hand end of the compartment $A^4$ whereas the partition $A^1$ rises at the left hand end and is connected to the upper wall of the chamber A so as to seal off the left hand end of the compartment $A^3$.

It will also be understood that where a conveyor passes through either of the partitions $A^1$ or $A^2$ there will be limited communication between the compartments on the two sides of the partition but that the opening will be made as small as is consistent with mechanical requirements.

What we claim as our invention and desire to secure by Letters Patent is:

1. Apparatus for applying heat to pottery or other articles for drying or similar purposes comprising an endless flexible article-conveying device a substantial part of the length of which lies in a heat-applying zone, supports for the articles equally spaced along and carried by the article-conveying device, an endless flexible heater-conveying device a substantial part of the length of which also lies in the heat-applying zone, spaced electrical heating elements carried by the heater-conveying device, said heating elements successively lying adjacent to but out of contact with a surface of an article on a support on the article-carrying device, means for supporting the parts of the article-conveying device and the heater-conveying device which pass through the heat-applying zone in close proximity and spaced relationship with a heating element closely adjacent to a surface of each article, and means for driving the article-conveying device and the heater-conveying device at the same linear speed whereby the articles and the heating elements lying adjacent to them travel through the heat-applying zone, the supports for the pottery or other articles and the supports for the electrical heating elements including cooperating parts which come into engagement as the two conveynig devices approach one another at the beginning of the heat-applying zone and serve to locate each heating element in close proximity to but out of contact with its associated article as the conveying devices travel together through the heat-applying zone.

2. Apparatus for applying heat to pottery or other articles for drying or similar purposes comprising an endless flexible article-conveying device a substantial part of the length of which lies in a heat-applying zone, spaced supports for the articles pivotally suspended from the article-conveying device so as to be suspended from such device, an endless flexible heater-conveying device a substantial part of the length of which also lies in the heat-applying zone, a series of spaced electrical heating elements pivotally suspended from the heater-conveying device and each capable of lying adjacent to a surface of an article on a support on the article-conveying device, means for supporting the parts of the article-conveying device and the heater-conveying device which pass through the heat-applying zone in close proximity and such relationship that a heating element lies in close proximity to but not in contact with a surface of each article, and means for driving the article-conveying device and the heater-conveying device at the same linear speed so that the articles and the heating elements lying adjacent to them travel together through the heat-applying zone, the pivoted supports for the pottery or other articles and the supports for the electrical heating elements including cooperating parts which come into engagement as the two conveying devices approach one another at the beginning of the heat-applying zone and serve positively to locate each heating element in close proximity to but out of contact with its associated article as the conveying devices travel together through the heat-applying zone.

3. Apparatus for applying heat to pottery or other articles for drying or similar purposes as claimed in claim 1, including electrical bus bars disposed parallel to the heater-conveying device and connected to a source of electrical supply, and collector brushes or shoes carried by the heater-conveying device, and engaging the bus bars and connected to the electric heating elements, in combination with guides at one end of the heat applying zone along which the two conveyor devices pass, means for adjusting said guides in the direction of the length of the heat applying zone to vary the effective length of each zone, the vertical width of said bus bars being increased over the longitudinal distance through which said guides can be adjusted to provide for contact between said collector brushes and bus bars irrespective of the longitudinal position of adjustment of said guides.

4. Apparatus for applying heat to pottery or other articles for drying or similar purposes as claimed in claim 1, in which adjustable guides are provided at one end of the heat-applying zone along which the two conveying devices pass, and means are provided for adjusting the guides in the direction of the length of the heat-applying zone to vary the effective length of such zone.

5. Apparatus for applying heat to pottery or other articles for drying or similar purposes as claimed in claim 1, in which each of the two conveying devices is provided at one end of the heat-applying zone with a guide member mounted upon a support which is adjustable in the common direction of travel of the conveying devices through the heat-applying zone over which guide members said two conveying devices pass, thereby enabling the effective length of the heat-applying zone to be varied.

6. Apparatus for applying heat to pottery or other articles for drying or similar purposes as claimed in claim 5, in which the supports for the pottery or other articles and for the electric heating elements have cooperating parts which come into engagement as the two conveying devices approach one another at the beginning of the heat-applying zone and said cooperating parts serve positively to locate each heating element in relation to its associated article as the conveyors travel together through the heat-applying zone.

7. Apparatus for applying heat to pottery or other articles for drying or similar purposes as claimed in claim 6, including a movable support for the guide members, reversible electrically-driven power-operated mechanism for moving the support back and forth in the direction of travel of the two conveying devices through the heat-applying zone, and a manual control for such power-operated mechanism.

8. Apparatus for applying heat to pottery or other articles for drying or similar purposes as claimed in claim 1, in which the supports on the article-conveying device and the heater-conveying device have self-alining means comprising slotted parts on the supports of one of the conveying devices the slots in which are entered by cooperating parts of the supports on the other conveying device as the conveying devices approach one another at the beginning of the heat-applying zone to locate each heating element positively in relation to its associated article during their joint travel through the heat-applying zone.

9. Apparatus for applying heat to pottery or other articles for drying or similar purposes as claimed in claim 1, comprising an air heating chamber substantially separate from the heat-applying zone and through which passes a part of the heater-conveying device following a path removed from the heat-applying zone, in an air drying chamber, and means for drawing air through the air heating compartment so that it is heated by the heating elements and delivering it to said drying chamber through which the article-conveying device passes after the articles have been removed from the supports thereon.

10. Apparatus for applying heat to pottery or other articles for drying or similar purposes as claimed in claim 9 in which moulds are provided for supporting the articles on the article-conveying device, and an air discharge member having a slot-like orifice is spaced above the moulds through which orifice part at least of the air delivered to the compartment through which the article-conveying device passes after the articles have been removed therefrom is discharged into the moulds.

11. Apparatus for applying heat to pottery or other articles for drying or similar purposes comprising a compartment forming a heat-applying zone, an endless article-conveyor a substantial part of the length of which lies in said heat-applying zone, spaced supports extending laterally from opposite sides of the article-conveyor, an endless heater-conveyor a substantial part of the length of which also lies in said heat-applying zone, a series of spaced electrical heating elements supported on opposite sides of the heater-conveyor and each capable of lying partly or wholly within an article on the article-conveyor, supports for the article-conveyor and the heater-conveyor which in the heat-applying zone are spaced to support the conveyors in close proximity and such relationship that a heating element lies at least partly within each article, said supports being spaced to cause the parts of the conveyors outside this zone to follow paths remote from one another, means for driving the conveyors at the same linear speed, cooperating parts on the supports on the two conveyors which when they come into proximity in the heat-applying zone engage with one another positively to locate the heating elements in relation to the articles and, as the conveyors leave this zone, disengage from one another, a chamber through which a part of the heater-conveyor remote from the heat-applying zone passes, bus bars supported adjacent to the heater-conveyor substantially throughout its length, means for connecting the bus bars to a source of electrical supply, brushes carried by the supports of the heater-conveyor engaging the bus bars and electrically connected to the heating elements, a chamber through which the article-conveyor passes after removal of the articles therefrom, and means for withdrawing air continuously from the compartment through which passes the part of the heater-conveyor remote from the heat-applying zone and delivering it to the compartment through which passes the article-conveyor after the articles have been removed therefrom.

12. Apparatus for applying heat to pottery or other articles as claimed in claim 11, in which a slot-like nozzle member is supported in the compartment through which the article-conveyor passes after removal of articles therefrom so as to lie above the supports on that conveyor, and means whereby part at least of the air delivered to the said compartment is delivered to the said slot-like nozzle member the nozzle of which directs air into the article supports.

13. Apparatus for applying heat to pottery or other articles for drying or similar purposes comprising a compartment forming a heat-applying zone, an endless article-conveyor a substantial part of the length of which lies in said heat-applying zone, spaced supports extending laterally from opposite sides of the article-conveyor, an endless heater-conveyor a substantial part of the length of which also lies in said heat-applying zone, a series of spaced electrical heating elements supported on opposite sides of the heater-conveyor and each capable of lying partly or wholly within an article on the article-conveyor, supports for the article-conveyor and the heater-conveyor which in the heat-applying zone are spaced to support the conveyors in close proximity and such relationship that a heating element lies at least partly within each article, said supports being spaced to cause the parts of the conveyors outside this zone to follow paths remote from one another, means for driving the conveyors at the same linear speed, cooperating parts on the supports on the two conveyors which when they come into proximity in the heat-applying zone engage with one another positively to locate the heating elements in relation to the articles and, as the conveyors leave this zone, disengage from one another, a chamber through which a part of the heater-conveyor remote from the heat-applying zone passes, bus bars supported adjacent to the heater-conveyor substantially throughout its length, means for connecting the bus bars to a source of electrical supply, and brushes carried by the supports of the heater-conveyor engaging the bus bars and electrically connected to the heating elements.

SYDNEY JACK MOORE.
CLEMENT TOM WEDGWOOD.

REFERENCES CITED

The following references are of record in the file of this patent:

UNITED STATES PATENTS

| Number | Name | Date |
|---|---|---|
| 2,261,149 | Emerson | Nov. 4, 1941 |
| 2,485,609 | Koster et al. | Oct. 25, 1949 |

FOREIGN PATENTS

| Number | Country | Date |
|---|---|---|
| 586,358 | Great Britain | Mar. 17, 1947 |